(12) United States Patent
Tanaka et al.

(10) Patent No.: US 7,169,432 B2
(45) Date of Patent: Jan. 30, 2007

(54) TOASTED SOYBEAN FLAKES AND METHOD OF MAKING SAME

(75) Inventors: Itaru (Terry) Tanaka, West Des Moines, IA (US); Safir Moizuddin, Ames, IA (US)

(73) Assignee: Microsoy Corporation, Jefferson, IA (US)

( * ) Notice: Subject to any disclaimer, the term of this patent is extended or adjusted under 35 U.S.C. 154(b) by 152 days.

(21) Appl. No.: 10/793,238

(22) Filed: Mar. 4, 2004

(65) Prior Publication Data

US 2005/0196516 A1    Sep. 8, 2005

(51) Int. Cl.
*A23L 1/20*    (2006.01)

(52) U.S. Cl. ............... 426/634; 426/520; 426/466; 426/469

(58) Field of Classification Search ........... 426/634, 426/520, 466, 469
See application file for complete search history.

(56) References Cited

U.S. PATENT DOCUMENTS

| | | | |
|---|---|---|---|
| 2,585,793 A * | 2/1952 | Kruse | 426/431 |
| 3,168,406 A * | 2/1965 | Moshy | 426/254 |
| 3,941,890 A | 3/1976 | Drachenberg | |
| 3,971,856 A * | 7/1976 | Daftary | 426/417 |
| 4,041,187 A | 8/1977 | Nelson | |
| 4,103,034 A | 7/1978 | Ronai | |
| 4,332,092 A * | 6/1982 | Hansotte | 34/515 |
| 4,409,256 A | 10/1983 | Johnson | |
| 4,639,216 A | 1/1987 | Schnupp | |
| 4,748,038 A | 5/1988 | Lewis | |
| 4,810,513 A * | 3/1989 | Van Liere | 426/465 |
| 4,813,438 A * | 3/1989 | Fleming | 131/359 |
| 4,895,730 A | 1/1990 | Chikarashi | |
| 4,923,710 A * | 5/1990 | van der Marel | 426/634 |
| 5,710,365 A | 1/1998 | Kerr | |
| 5,727,689 A * | 3/1998 | Anderson et al. | 209/139.1 |
| 5,936,069 A | 8/1999 | Johnson | |
| 6,391,374 B1 | 5/2002 | Gray | |
| 6,426,111 B1 | 7/2002 | Hirsch | |
| 6,495,140 B1 | 12/2002 | Collins | |
| 6,808,621 B1 * | 10/2004 | Cisneros | 208/133 |

FOREIGN PATENT DOCUMENTS

DE            3314092         *   9/1983

OTHER PUBLICATIONS

*Soybean Digest*—Jun. 1959, vol. 19—5 pages.

* cited by examiner

*Primary Examiner*—Anthony Weier
(74) *Attorney, Agent, or Firm*—Sturm & Fix LLP

(57) ABSTRACT

The invention relates to toasted full fat, enzyme active soybean flakes, and method of making same. The inventive flakes are excellent for use in hot and cold cereal compositions including with rolled oats, in soybean flakes-potato flakes compositions for making soy protein enriched mashed potato products, in granola and power bar type compositions, in shake-and-bake type compositions, and in meat analogue veggie-burger type compositions. The inventive toasted full fat, enzyme active soybean flakes are prepared by subjecting full fat, enzyme active soybean flakes made from dehulled soybeans to relatively high heat from dry heated air for a relatively short time while moving on and/or above a moving or vibrating surface. The invention further relates to use of the inventive toasted soybean flakes in soybean flakes-potato flakes compositions, and said compositions per se.

12 Claims, 2 Drawing Sheets

TOASTED SOYBEAN FLAKES AND METHOD OF MAKING SAME

CROSS REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

This invention relates to toasted full fat, enzyme active soybean flakes and method for making same. The inventive toasting method substantially reduces undesirable beany or off-flavors commonly associated with prior art soybean flakes and soybean materials, without any substantial denaturing of the soy proteins. The present invention permits the use of soybean varieties other than the null varieties, usually required to avoid undesirable beany flavors associated with untoasted flakes. The usefulness and percentages of inventive toasted soybean flakes which can be used in numerous applications are significantly and unexpectedly increased over prior art soybean flakes and materials, without the occurrence of objectionable beany or cooked beany flavors. The avoidance of denaturing of the proteins in the toasted soybean flakes increases the amount of available proteins in the flakes, i.e., the proteins remain soluble and nutritionally valuable. The toasted soybean flakes are made by heating soybean flakes, made from full fat, enzyme active, mechanically dehulled soybeans, in hot fluidizing gas at temperatures and times sufficient to substantially eliminate beany or other off flavors, but insufficient to denature the soy proteins. The toasting also results in a desirable nutty or roasted flavor useful in cereal, soybean flakes-potato flakes, shake-and-bake, hot beverage mix, granola, and power bar type applications. The toasted flakes are especially and unexpectedly useful in hot and cold cereal compositions containing rolled oats, and in soy protein enriched soybean flakes-potato flakes compositions, having enhanced soybean flake levels. The toasted flakes are also particularly useful in shake and bake, granola, power bar, hot beverage, and meat analogue veggie burger type compositions. The invention relates also to these compositions, per se. The inventive toasted soybean flakes are particularly and unexpectedly useful in increasing the amount of soybean flakes which can be incorporated in soy protein enhanced soybean flakes-potato flake compositions, and rolled oat cereal compositions, while maintaining good taste and texture, and avoiding beany or off-flavors.

BACKGROUND AND DESCRIPTION OF RELATED ART

Soybeans have long been a staple of the Asian diet in multiple food forms including tofu and soymilk, among many other soy based and fermented foods. Soybeans are excellent sources of protein. Enzyme active soy protein, i.e., soy protein which has not been denatured, has a desirable amino acid profile for nutritional purposes, and includes other health promoting elements such as phytoestrogens. In recent years, demand for soy foods has grown dramatically in the United States and other western countries, principally in the form of meat analogues, nutrition bars and powdered nutrition beverages prepared from soy protein isolates and concentrates. Chemically fractionated soy ingredients and soymilk are prepared by modernized methods to reduce much of the traditional "beany" flavor favored in the East, but severely objected to in the West. Demand for natural and organic foods has grown at an extraordinary rate. Foods designated "natural" and/or "organic" generally cannot utilize chemically processed materials. The soy ingredients commonly used today are not full fat or oil, having been treated with solvents such as hexane to remove fats or oils. The terms "fats" and "oils" are used interchangeably with respect to soybeans in the prior art and in this application. The defatted concentrates or isolates do not qualify as natural or organic, as has been increasingly popular in today's market. U.S. Pat. Nos. 6,495,140 and 6,426,111, for example, illustrate preparation of soy fractionates and/or isolates using solvent extraction.

The soybean flakes useful in making the toasted soybean flakes of the present invention are made from full fat, enzyme active, dehulled soybeans, such as by the method recited in U.S. Pat. No. 4,895,730. This patent is incorporated herein by reference, and is assigned to MicroSoy Corporation, 300 East MicroSoy Drive, Jefferson, Iowa 50129. The soybean flakes used in the present invention qualify as "natural"; and when prepared from soybeans qualifying as organically grown, also qualify as organic foodstuffs.

Full fat, enzyme active (i.e., wherein the proteins are not denatured), dehulled soybeans are excellent sources of elements necessary for good health, and supply outstanding nutritional and nutraceutical benefits. Undenatured soybeans and soybean flakes are excellent sources of protein, iron, vitamin-B, calcium, lecithin and isoflavones. In particular, the lecithin content is from about 2.7 to 3.1 percent. Soybeans also contain essential minerals including phosphorus, which is an essential element used by the body for building bones. Soy isoflavones are now considered helpful in reducing risks for cancer, heart disease, and osteoporosis. Pure soya contains about 38–42% protein, 18–22% fat or oil (of this lecithin is 2.7–3.1%), 25–35% carbohydrate, 1.5–2.5% minerals, 3–5% fiber, and 5–6% water. Full soya flour furnishes about 89 grams of protein per 1000 calories, i.e., about 132 grams of protein and 44 grams oil per 1000 grams. By contrast potatoes contain only about 21 grams of protein per 1,000 calories. In addition, since soybeans do not contain particular glutens, products containing substantial amounts of soybeans offer an alternative for people suffering from celiac disease and/or gluten allergies. Full soya flour contains about three times the grams of protein per 1000 grams as lean beef. A "typical analysis of soy flour and soy grits appears in "*The Soybean Digest*", Vol. 19, No. 8, June 1959, pages 8 to 9, as follows:

|  | Full fat | High fat | Low fat | Defatted |
|---|---|---|---|---|
| Protein, % | 40.0 | 45.0 | 48.0 | 52.0 |
| Fat, % | 20.0 | 15.0 | 5.0 | 0.5 |
| Fiber, % | 2.5 | 2.5 | 3.0 | 3.0 |
| Ash, % | 5.0 | 5.0 | 5.5 | 6.5 |
| Moisture, % | 8.0 | 8.0 | 8.0 | 8.0 |

MicroSoy$^R$ full fat, enzyme active soybean flakes contain 40–48% protein, 19.0% fat/oil, 2.1% fiber, 4.79% ash, 8.08% moisture, and 27.59% carbohydrate.

There exists in the prior art need for soybean and soy protein enriched products, having good taste, texture, and processibility in standard food processing equipment. The present inventors and the prior art faced the problem that unfortunately products containing large amounts of soybeans tend to exhibit undesirable taste and/or texture properties. For example, products containing large amounts of soy materials, may exhibit unpleasant characteristics including chalkiness and/or mouth dryness, grittiness, grassy flavor, bitter flavor, salty flavor, and astringency. The present inventors also faced the problem that amounts of soybean flakes which could be used in various compositions was limited by beany and other objectionable flavors incurred at higher soybean flake concentrations; thus, requiring at higher concentrations the use of expensive triple null variety soybeans. This was especially true of soybean flakes-potato flakes compositions, such as disclosed in copending U.S. patent application Ser. No. 10/382,697, where the amount of soybean flakes was limited to 45%, by the occurrence of beany flavors at higher amounts. This patent application was filed Mar. 6, 2003 in the names of inventors Itaru Tanaka, Safir Moizuddin, and Bruce Liu; and titled COMPOSITION CONTAIING SOYBEAN FLAKES AND POTATO FLAKES, METHOD FOR MAKING A FOOD PRODUCT THEREFROM, AND SAID FOOD PRODUCT. This patent application is incorporated herein by reference; and, will be referred to herein by Ser. No. or as "the '697 application" The present inventors faced the problem that null variety soybeans, especially the expensive triple null, were required to avoid beany flavors. There was clearly a need for soybean flakes which could be made with a wide range of soybean varieties without incurring objectionable beany flavors. Moreover, the present inventors and the prior art faced the problem that soybeans do not contain certain proteins, such as prolamines, gliadin or glutenin, nor sufficient starches, that provide elasticity, cohesiveness and binding during processing.

The present inventors have discovered a method of preparing toasted soybean flakes which significantly reduces and/or eliminates the beany or off-flavors associated with soy materials, while minimizing denaturing of soy proteins. The inventive toasted flakes are made by the inventive process from full fat, enzyme active soybean flakes prepared from dehulled soybeans. They have discovered that unexpectedly high amounts of the inventive toasted soybean flakes can be incorporated in soybean flakes-potato flakes compositions disclosed in the '697 application.

U.S. patent application Ser. No. 10/792,955, has been filed on even date with the present invention, in the name of inventors Itaru Tanaka and Safir Moizuddin, and is titled IMPROVED COMPOSITIONS CONTAINING TOASTED SOYBEAN FLAKES AND POTATO FLAKES, METHOD FOR MAKING A FOOD PRODUCT THEREFROM, AND SAID FOOD PRODUCT. That application discloses toasted soybean flakes-potato flakes compositions containing up to 60% toasted soybean flakes, and is incorporated herein by reference. Use of the inventive toasted flakes unexpectedly permits, contrary to the maximum of 45% soybean flakes set forth in the application Ser. No. 10/382,697, inclusion of up to 60% toasted soybean flakes, while retaining excellent flavor and texture. Application Ser. No. 10/382,697 teaches that amounts higher than 45%, even with soybean flakes made from triple null soybean varieties, results in undesirable changes in taste and texture.

Moreover, as discussed in the '697 application, the average serving of potato (one medium potato or about 148 grams) contains only 3 grams of protein. Thus, there is a need for mashed potato products having significantly increased protein content, without negatively affecting the consumer acceptance thereof, and to make the health claim of providing a minimum of 6.25 grams of soy protein per serving. Moreover, potato products, such as mashed potatoes containing 100% potatoes, are known in the art to exhibit a bland starchy taste and pasty feel. This is due in part to the fact that potatoes contain large amounts of starch, but little or no fat or oil. Moreover, potato is in the nightshade family and suspect in certain arthritic maladies. Soybean flakes-potato flakes compositions made possible by the present invention contain significantly reduced amounts of potato than previously thought possible. Toasting of the full fat, enzyme active soybean flakes by the method of the present invention produces a novel toasted soybean flake which can be used in unexpectedly high amounts of up to about 60% soybean flakes in soybean flake-potato flake compositions, while maintaining desirable taste and texture.

Prior Art

Roasting of soy materials to reduce beany or off-flavors has been generally known in the prior art, as illustrated by U.S. Pat. Nos. 5,936,069 and 3,971,856 (see second paragraph of Description). However, the prior art roasting procedures have generally been carried out, not on full fat, enzyme active soybean flakes made from dehulled soybeans, but on defatted or chemically treated or otherwise prepared soy materials. Furthermore, the roasting processes of the prior art have generally been carried out by heating methods other than that of the present invention, and at temperatures and conditions causing significant denaturing of the soy proteins. The present invention differs variously from the prior art in that the starting soybean flakes are not defatted or chemically treated, or steam heated, or made from soybean meal or flour. The reduction of the soybean material in the prior art to meal or flour significantly increases its exposure to oxidation and results in generation of off-flavors and denaturizaton of the soy proteins. In the present invention the full fat, enzyme active soybean flakes are made from dehulled soybeans, such as by the method shown in U.S. Pat. No. 4,895,730, which flakes are subjected quickly to blown fluidizing dry air heat while moving on and/or above a vibrating surface. The process of the present invention has the additional benefits of reducing fines and of permitting use in applications such as granola-type food bars.

U.S. Pat. No. 6,391,374 is illustrative and teaches pre-toasting defatted soy flakes to reduce the bittery or beany off-flavors of the soybean due to lipid peroxidation catalyzed by lipoxygenase.

U.S. Pat. No. 3,971,856 illustrates subjecting dehulled, cracked soybeans to water at 180° F. to a maximum of 212° F. to eliminate any toasting of the soybeans.

U.S. Pat. No. 4,810,513 shows making full fat soybeans flakes from raw soybeans with hulls intact, including the step of drying the flakes in a forced air drier by alternating application of superheated air.

U.S. Pat. No. 4,041,187 illustrates heating tenderized soybean cotyledons sufficiently, such as in an air drier at 200° F. for five minutes, to deactivate the lipoxygenase enzymes.

U.S. Pat. No. 3,941,890 illustrates making soy milk including cooking soybeans in a microwave oven for a time sufficient to destroy the trypsin inhibitor and eliminate any unpleasant beany taste, but for a time insufficient to roast the material.

U.S. Pat. No. 4,103,034 illustrates preparing dried flaked textured vegetable protein from defatted or full-fat soybean flour, which has been dried at temperatures which assure partial or substantial deembitterment without scorching. The '034 patent discusses toasting carried out preferably at between 180 and 200° F. for preferably between 1.5 and 2.5 hours, using hot dry air (page 12).

U.S. Pat. No. 5,710,365 teaches heat treating de-oiled (defatted) soybean flakes to denature the protein therein.

U.S. Pat. No. 4,748,038 illustrates subjecting whole or dehulled and split soybeans to live steam or water for a time sufficient to avoid green, painty or raw flavors developing and short enough such that beany or bitter flavors do not develop.

U.S. Pat. No. 4,409,256 shows making soymilk involving comminuting whole soybeans having the hulls on, forming a slurry and simultaneously heating by an infusion of live steam initiating inactivation of trypsin inhibitor and lipoxygenase without fixing or substantially denaturing the soybean protein.

U.S. Pat. No. 4,639,216 shows flame roasting cereal grains including soybeans to destroy toxic enzymes in the raw soybeans which interfere with digestion and growth in animals, and to sterilize the grain.

U.S. Pat. No. 4,923,710 shows roasting deskinned and split soybean halves which have been soaked for swelling and then dewatered.

SUMMARY OF THE INVENTION

It is an object of the present invention to make toasted full fat, enzyme active soybean flakes from dehulled soybeans which toasted flakes have improved flavor characteristics, as compared with prior art soybean products, while retaining the soy protein in soluble form (substantially undenatured). The inventive toasted full fat, enzyme active soybean flakes are prepared by subjecting full fat, enzyme active soybean flakes made from dehulled soybeans to relatively high heat from dry heated fluidizing air for a relatively short time, while moving on and/or above a moving or vibrating surface. It is a further object of the present invention to make toasted full fat, enzyme active soybean flakes particularly useful in hot and cold cereal compositions including with rolled oats, in soybean flakes-potato flakes compositions for making soy protein enriched mashed potato products, in granola and power bar type food compositions, in shake and bake type compositions, in hot beverage mix compositions similar to malted milk mixes, and in meat analogue veggie burger type compositions.

It is a further object of the present invention to use the inventive toasted soybean flakes in soybean flakes-potato flakes compositions, and in cereal compositions containing rolled oats, having unexpectedly higher amounts of soybean flakes than previously thought possible, while retaining excellent taste and texture. The toasted soybean flakes of the present invention permit the unexpected inclusion of up to about 60% soybean flakes in soybean flakes-potato flakes compositions, as opposed to the 45% maximum disclosed in copending U.S. patent application Ser. No. 10/382,697. The toasted soybean flakes of the present invention further permit the unexpected inclusion of 10% and greater toasted soybean flakes in rolled oats-toasted soybean flakes compositions, without incursion of beany or off-flavors. The use of the inventive toasted soybean flakes unexpectedly permits inclusion of 20, 30 and even 50% toasted soybean flakes in these cereal compositions without incurring beany or other undesirable flavors. Prior to the present invention, it was found that inclusion of 10% or more untoasted soybean flakes in rolled oat cereals resulted in undesirable beany flavor.

It is an additional object of the present invention to provide novel and unobvious compositions containing the inventive toasted soybean flakes. These include cereal compositions including those containing rolled oats; shake and bake type compositions; granola and power bar type compositions; hot beverage mix compositions similar to malted milk beverage mixes; and, meat analogue veggie burger type compositions.

It is a further object to provide soybean flakes which do not cause beany or other objectionable flavors even when present at high levels; and which do not require the use of null, especially triple null, soybeans to avoid beany and other objectionable flavors. For example, the soybean flakes-potato flakes compositions set forth in copending U.S. patent application Ser. No. 10/382,697 require null and particularly triple null soybean varieties to avoid beany and other objectionable flavors, even at soybean flake levels below 45% in the compositions. The present invention unexpectedly permits use of up to 60% soybean flakes without objectionable beany flavors. The inventive toasted soybean flakes of the present invention unexpectedly permit soybean flakes levels as high 20, 30 and even 50%, in rolled oats-toasted soybean flake cereal compositions, without objectionable beany flavors.

Where the toasted flakes of the present invention are subjected to medium and heavy toasting, they provide a nutty and toasted flavor. Medium toasting provides a sweeter flavor than heavier toasting. The sweeter flavor is particularly desirable in certain applications such as in cereal compositions; shake and bake type compositions; granola and power bar type compositions; and, powdered hot beverage mix compositions, somewhat similar to hot malted milk type mixes. The nutty and toasted flavors are particularly useful in toasted soybean flakes-potato flakes compositions, and meat analogue veggie burger type compositions. The present invention relates to each of these compositions.

The beneficial characteristics and usefulness of the toasted full fat, enzyme active soybean flakes of the present invention are unexpectedly achieved by subjecting full fat, enzyme active soybean flakes made from dehulled soybeans, such as by the method disclosed in U.S. Pat. No. 4,895,730, to the inventive toasting method of the present invention. The toasting method of the present invention subjects the soybean flakes to relatively high heat from dry heated fluidizing gas for a relatively short time, while moving on and/or above a moving or vibrating surface. The toasting method of the present invention reduces undesirable beany or off-flavors commonly associated with soybean flakes without significant protein denaturing, thereby significantly increasing their usefulness and the percentage soybean flakes which can be used in most applications. The toasting also results in a nutty flavor useful and desirable in various of the compositions of the present invention.

As previously discussed, the cited prior art variously differs from the present invention in using hulled (hull not removed) and/or de-fatted soy materials, concentrates or isolates. The present invention, on the contrary, utilizes full fat, enzyme active, dehulled soybean flakes. The dehulled, full fat, enzyme active soybean flakes used in applicants' invention provide significant advantages over soybean materials that have not been dehulled, or have been defatted or otherwise chemically treated, or processed by grinding or pressure extruding. Transforming the soybeans or soy material into small granules or especially powders dramatically and adversely increases the surface area of the soybean material exposed to oxygen and moisture, and the temperatures to which the soybean material is subjected. This exposure and unnecessary heating result in degradation of the soybean material including development of undesirable flavors and denaturing of soy proteins.

DETAILED DESCRIPTION OF THE INVENTION

Figure 1:
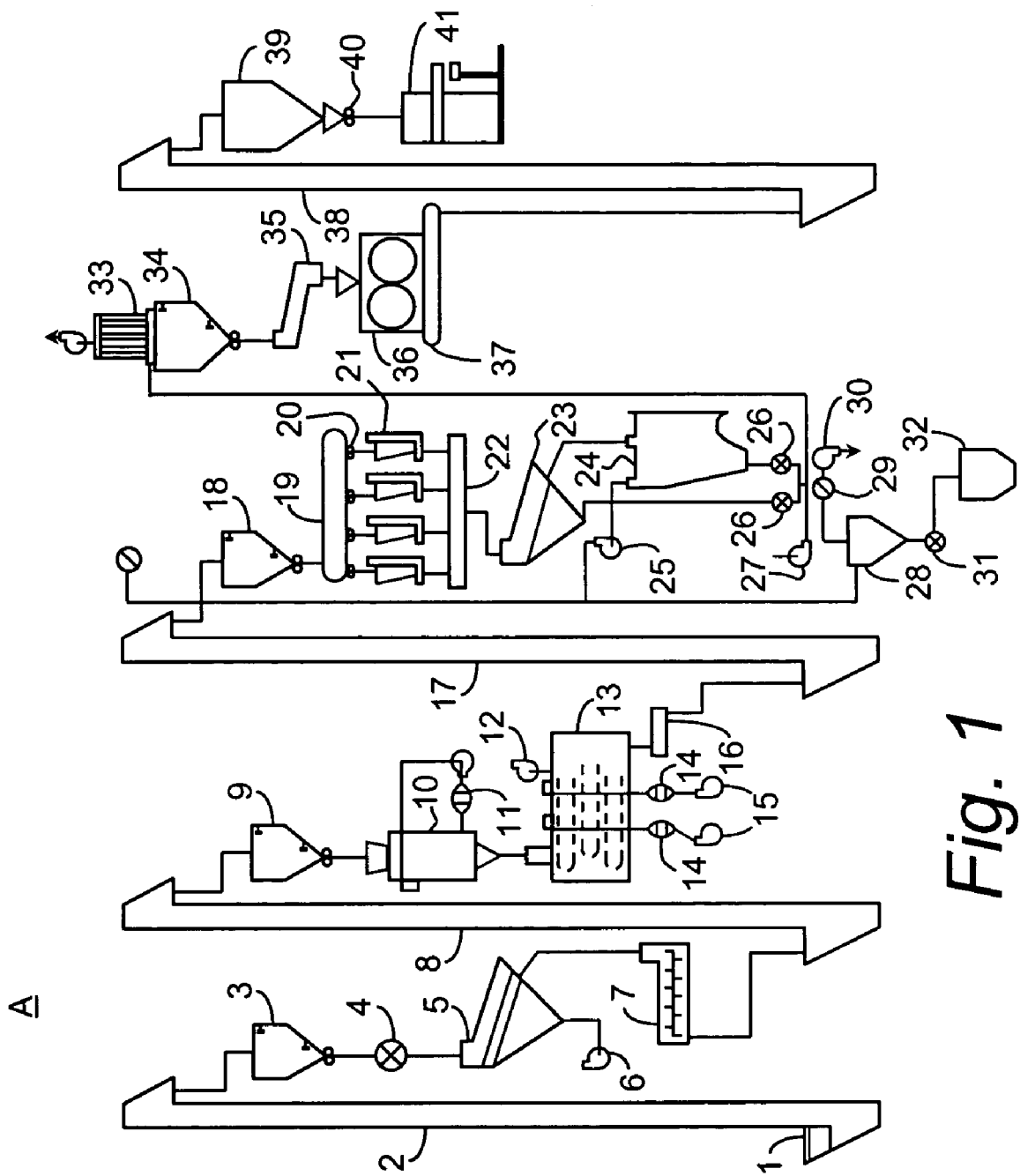
FIG. 1 is a block flow diagram showing method and apparatus for making MicroSoy Flakes[R] (MSF) from full fat, enzyme active, mechanically dehulled soybeans.

Soybean Flakes:

The soybean flakes useful for making the toasted flakes of the present invention are full fat, enzyme active, dehulled soybean flakes. "Full fat" refers to soybean flakes where no fat has been removed, except that very small amount lost during washing and dehulling. Such soybean flakes can be prepared in accordance with U.S. Pat. No. 4,895,730, which patent has been incorporated herein by reference. Soybean flakes prepared according to U.S. Pat. No. 4,895,730 are especially useful in the present invention and referred to herein as MicroSoy Flakes[R] and denoted herein a "MSF" or "SX". The preferred full fat, enzyme active soybean flakes made from dehulled soybeans are currently available from MicroSoy[R] Corporation in Jefferson, Iowa, marketed under the trademark MicroSoy[R] Flakes. These full fat, enzyme active MicroSoy Flakes[R] are mechanically dehulled and made substantially according to the method set forth in U.S. Pat. No. 4,895,730. As disclosed in this patent, the soybean flakes are prepared by (1) brushing the soybeans to remove earth matter and earth born germs; (2) adjusting the water content to facilitate separation of the skin portion; (3) separating the skin portion from the flesh portion, while simultaneously dividing the flesh portion of each soybean into four to eight parts; and, (4) passing the soybean granules thus obtained through flat-pressing rollers. A product in the form of a mass of uniformly distributed, dehulled, full fat, enzyme active soybean flakes is obtained. The heat resistant earth-born germs and sporal germs are completely removed during the brushing and dehulling or skinning of the soybeans. These germs are not removed by the conventional step of washing. The resulting soybean flakes and foodstuffs prepared therefrom are thus rendered less perishable and highly wholesome. It is advantageous that the soybeans be mechanically dehulled and processed. The temperature of the soybean material should not be subjected to temperatures higher than 55° C., and more preferably no higher than 50° C. High temperatures lead to denaturing of soybean protein. The process of the '730 patent is further described with reference to FIG. 1 in the BRIEF DESCRIPTION OF THE DRAWINGS.

The soybean flakes, such as used in making the inventive toasted flakes, are disclosed in the '730 patent as having a flake thickness of about 0.2 to 0.4 mm., and long storage capability. The useful thickness of the soybean flakes is controlled by the particular end use of the inventive toasted soybean flakes. The thickness of the flakes is controlled by the spacing of the rollers, which spacing is set to provide flakes of desired thickness. The present inventors have discovered that particular thickness soybean flakes are unexpectedly advantageous in the various end uses of their inventive toasted flakes. For example, toasted soybean flakes about 0.6 mm. thick are especially useful in "instant oatmeal" type products. Toasted soybean flakes having a thickness of about 0.6 mm. are particularly useful in cereal compositions containing rolled oats. Toasted soybean flakes about 1.2 mm. thick are particularly useful in "granola" and "power bar" type compositions. Toasted soybean flakes of the present invention having thickness of about 0.2 mm. are surprisingly advantageous in soybean flakes-potato flakes compositions.

The present invention unexpectedly permits use of numerous varieties of soybeans. Null, especially triple null, soybeans are normally required to avoid beany and other objectionable flavors. For example, the soybean flakes-potato flakes compositions set forth in copending U.S. patent application Ser. No. 10/382,697 require null and particularly triple null soybean varieties to avoid beany and other objectionable flavors, even at soybean flake levels at and below 45%. The toasted soybean flakes of the present invention unexpectedly permit use of up to 60% soybean flakes without objectionable beany flavors, while maintaining good taste and texture. In rolled oats-soybean flakes compositions, soybean flake levels of 10% and above result in objectional beany flavors. With the toasted soybean flakes of the present invention, unexpectedly soybean flakes levels as high 20, 30 and even 50%, without objectionable beany flavor, are achieved. Moreover, the present inventive method of making toasted soybean flakes allows use of black hilum varieties without carry over of color into the inventive toasted flakes and inventive compositions, which color some find unappetizing.

Toasting Method of Present Invention

The present inventors have discovered a method of toasting full fat, enzyme active soybean flakes which unexpectedly substantially reduces or eliminates the undesirable beany or off-flavors commonly associated with soybean flakes, without significant protein denaturing. The usefulness and relative amounts of the toasted soybean flakes which can be used is significantly and unexpectedly increased as compared with prior art soy materials and flakes. The inventive toasting method unexpectedly results at medium and heavy toasting level in a toasted soybean flake having a desirable nutty flavor, and does not suffer from the drawbacks of prior art soy materials and flakes, especially at high soy concentrations, of beany or off-flavors. Medium toasted soybean flakes have been found to additionally provide a sweet flavor desirable in cereal, hot beverage and other uses. The soybean flakes toasted by the present invention are unexpectedly useful in hot and cold cereal compositions, including those made with rolled oats; soybean flakes-mashed potato flakes compositions for making mashed potato products; granola and power bar type compositions; shake-and-bake type compositions; hot beverage mix compositions similar to malted milk type mixes; and, meat analogue "veggie burger" type compositions.

The toasting method of the present invention subjects the soybean flakes to relatively high heat from dry heated fluidizing air for a relatively short time while moving on and/or above a moving or vibrating surface. The toasting method of the present invention reduces undesirable beany or off-flavors commonly associated with soybean flakes without significant protein denaturing thereby significantly increasing their usefulness and the percentage soybean flakes which can be used in most applications. The toasting results in some applications in a desirable nutty flavor.

The present inventive toasting method comprises the steps of:

(1) metering full fat, enzyme active soybean flakes made from dehulled soybeans into one end of a fluid bed toaster-drier, at a flow rate dependent on the thickness of starting soybean flakes and the desired level of toasting;

(2) contacting the soybean flakes in the toaster-drier with heated dry fluidizing gas at a temperature and for a time sufficient to toast the flakes, whereby the beany and/or off-flavors are substantially reduced or eliminated, without significant denaturing of the proteins in the flakes;

(3) passing the toasted flakes from the toaster-drier to a cooler, where the toasted flakes are cooled to desired ambient temperature; and, (4) transferring the cooled flakes to packaging or other storage or directly to end use.

The toasted soybean flakes need not be cooled to ambient temperature when it is advantageous to use them at temperatures above ambient. The toaster-drier and the cooler are preferably of the vibratory fluid bed type. The temperature of the toaster-drier is maintained between 350 and 420° F., depending on the thickness of the soybean flake and the desired level of toasting. For example, temperatures between 350 and 360° F. are used for light toasting flakes having a thickness of about 0.02 mm. Temperatures for medium and heavy toasting flakes, having a thickness of about 0.02 mm., are preferably between 366 to 380° F. and 370 to 390° F., respectively. In a preferred embodiment of the inventive toasting method, full fat, enzyme active soybean flakes made from dehulled soybeans are metered into a vibratory fluid bed toaster-drier at a flow rate, temperature, and residence time controlled according to the desired degree of toasting.

Table 1 below sets forth examples of typical toaster and cooler operating conditions for different soybean flake thicknesses (i.e., 0.02 mm., 0.06 mm. and 1.2 mm.), and toasting levels (i.e., low "L", medium "M" and high "H"). In Table 1, the designation TSX02-L, for example, refers to toasted "T" conventional MicroSoy Flakes[R] "SX" having a thickness of 0.02 mm. "02", and subjected to a light toast "L". TSX06-M refers to toasted MicroSoy Flakes[R] "SX" having a thickness of 0.06 mm., which are medium toasted.

TABLE 1

| Product | Toaster conditions. | | | | |
|---|---|---|---|---|---|
| | Input Flow Rate (lbs./min.) | Product Depth (inches) | Toaster Temp. (° F.) | Toaster Freq./RPM (Hz./RPM) | Cooler Freq. (Hz.) |
| TSX02-L | 4.5–5.0 | 1–3.0 | 350–360 | 750–976 | 40–47 |
| TSX02-M | 4.5–5.0 | 2.5–3.0 | 366–380 | 800–976 | 45–47 |
| TSX02-H | 4.5–5.0 | 2.5–3.0 | 370–390 | 800–1008 | 40–47 |
| TSX06-L | 5.2 | 2.0 | 360 | 1115 | 58 |
| TSX06-M | 5.2 | 2.0 | 370 | 1115 | 39 |
| TSX06-H | 6.5 | 2.5–3.0 | 380–420 | 1000–1050 | 45–55 |
| TSX12-L | — | — | — | — | — |
| TSX12-M | 6.5 | 2.5–3.0 | 380 | 1000–1100 | 40–45 |
| TSX12-H | 5 | 3 | 420 | 800–1000 | 42 |

Note:
TSX12-L was not run due to the relative thickness of the flakes.

The present inventors have discovered that toasting temperatures in the range of about 350 to 420° F. and toasting times of about 3 to 5 minutes are particularly useful. A temperature of about 360° F. has been found useful, especially for lighter toasting. Within these temperatures and times, the flakes are quickly heated to a high heat using dry hot fluidizing gas, thereby removing or eliminating a high percentage of the beany or off-flavors, while minimizing and avoiding denaturing of the protein in the soybean flakes. Thus, a high percentage of the proteins remain soluble and nutritionally available.

The inventive toasting method is further described with reference to FIG. 2 in the BRIEF DESCRIPTION OF THE DRAWINGS.

BRIEF DESCRIPTION OF THE DRAWINGS

FIG. 1 is a block flow diagram showing method and apparatus for making MicroSoy Flakes[R] (MSF) from full fat, enzyme active, mechanically dehulled soybeans. The MicroSoy Flakes[R] are the most preferred flakes for making the toasted soybean flakes of the present invention. This method and apparatus are disclosed in referenced U.S. Pat. No. 4,895,730, and will be described herein in reference to present FIG. 1. Reference character A denotes the manufacturing apparatus used for making the soybean flakes used in the present invention. It comprises a brushing machine 7 for brushing off earth matter and earth born germs on or deposited on the soybeans introduced thereto via inlet port 1, bucket elevator 2, soybean stock tank 3, rotary feeder 4, and separator 5. At separator 5, dust and the like are separated from the soybeans by fan 6. The brushed soybeans are removed from the brushing machine and thereafter passed to a service tank 9 by a bucket elevator 8. The soybeans are then delivered to a preheating dryer 10 having a heater 11, and thence to a band dryer 13 having gas pumps 15 and heaters 14. Both driers are kept constantly at about 55° C. so that some of the water content of the soybeans is removed. The amount of water removed at this stage can be adjusted by regulating the rotational speed of the band drier 13. Gases are removed from the drier 13 by fan 12. The soybeans from which part of the water content has been removed pass from dryer 13 via chamber 16 into bucket conveyor 17, and thence into storage tank 18. The soybeans are then delivered in predetermined quantities through a slide gate onto an O-type chain conveyor 19. The chain conveyor delivers the soybeans in predetermined quantities to slide gates 20 provided at four locations to the skin remover 21. In the skin remover 21 the soybeans are each divided into 4 to 8 parts, and simultaneously the skin portions are separated from the flesh portions. The so separated and divided masses of the material are delivered by a screw conveyor 22 to a separator 23, in which powdery masses are separated from granular masses. The granular masses are delivered to the classifier 24, where they are again further separated into granular masses and powdery masses. The further separated powdery masses are removed from separator 24 by blower 25 for delivery into a skin storage tank 32 via cyclone 28. Gases are removed from cyclone 28 via valve 29 by pump 30. The powdery masses are delivered from cyclone 28 via valve 31 to skin storage tank 32. The granular masses from separator 23 and separator 24 are conveyed through rotary feeders 26 and moved by blower 27 to storage tank 34. From the storage tank 34, the granular masses are fed in predetermined flow and in a uniformly scattered form by an oscillatory feeder 35 for passage through flat pressing rollers 36. Thus, a product in flaky form of desired thickness, such as in the range 0.2 to 1.2 mm., is continuously produced. The product in flaky form is dropped onto a belt conveyor 37, and then delivered by a bucket elevator 38 to a product tank 39. By opening slide gate 40, the product is fed to an automatic dispenser 41, by which it is packaged for further use or shipment.

Figure 2:
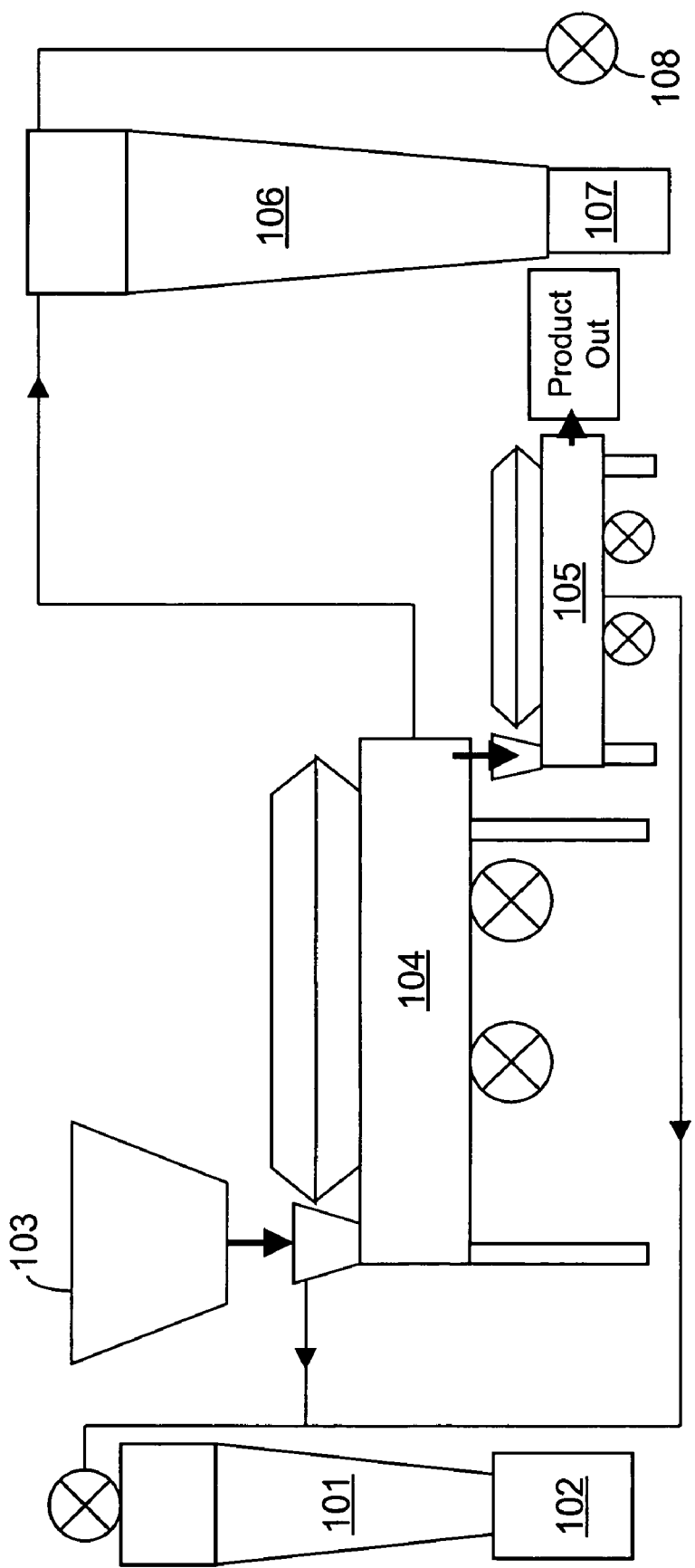
FIG. 2 is a block flow diagram showing one embodiment of the inventive soybean flake toasting method and apparatus.

FIG. 2 is a block flow diagram showing one embodiment of the inventive soybean flake toasting method and apparatus. Reference number 103 denotes a feeding tank and hopper for introducing full fat, enzyme active soybean flakes into vibratory toaster/dryer 104. The toasted soybean flakes pass out of toaster/dryer 104 into vibratory fluid bed cooler 105. The toasted cooled soybean flakes pass out of cooler 105 to a container labeled "Product". Gases and fines removed from the vibratory fluid bed cooler 105, as well as fines removed from the inlet end of toaster/dryer 104, are conveyed to cyclone 101 which includes dust collector portion 102. An additional cyclone 106, with associated dust collector portion 107, is also connected to vibratory fluid bed toaster/dryer 104. Gas outlet pump 108 is attached to the upper end of cyclone 106.

One embodiment of the present invention is described with reference to FIG. 2 and TABLE 1. Full fat, enzyme active soybean flakes made from dehulled soybeans are metered by feeder/hopper 101 into one end of vibratory fluid toaster/dryer 104 at a flow rate depending on the thickness of the soybean flakes and the desired level of toasting. For example, conventional MicroSoy Flakes$^R$ having a thickness of 0.2 mm. (denoted TSX02-M in TABLE 1) were Medium toasted at an input flow rate of 4.5–5.0 lbs./min., a product depth of 2.5–3 inches in the toaster, a toaster temperature of 366–380° F., a toaster vibration frequency or RPM of 800–976, and a cooler frequency of 45–47 (Hertz). The toasted flakes were bagged in 20 kg. bags and stored in a dry cool area. The toasting time was maintained such that substantial reduction or elimination of the beany or off-flavors occurred, but without an significant denaturing of the soy protein. This time is generally between 3 and 5 minutes.

Soybean Flakes-Potato Flakes Embodiment

The present inventors have discovered an unexpected advantage of full fat, enzyme active soybean flakes, toasted according to their inventive method, in soybean flakes-potato flakes compositions, such as disclosed in copending U.S. patent application Ser. No. 10/382,697. As disclosed in that patent application, the maximum useful amount of full fat, enzyme active untoasted soybean flakes in the disclosed soybean flakes-potato flakes compositions, without deleterious changes in taste and texture, was 45%. The present inventors have discovered use of the toasted soybean flakes of the present invention unexpectedly permits inclusion of up to 60% soybean flakes in soybean flakes-potato flake compositions.

Hot Beverage Mix Embodiment

The present inventors have discovered another unexpected advantage the inventive toasted soybean flakes is their use hot beverage type compositions.

Toasted Soybean Flakes-Rolled Oats Cereal Embodiment

The toasted soybean flakes of the present invention allow the unexpected inclusion of 10% and greater toasted soybean flakes in rolled oats-toasted soybean flakes compositions, without the normally expected beany or off-flavors. Prior to the present invention, inclusion of 10% or more untoasted soybean flakes in rolled oat cereals was found to result in undesirable and unacceptable beany flavor. The use of the inventive toasted soybean flakes unexpectedly permits inclusion of 20, 30 and even 50% toasted soybean flakes in these cereal compositions without incurring beany or other undesirable flavors.

Comparative Test of Advantages of Toasted Microsoy Flakes over Untoasted Microsoy Flakes A taste test was done to determine the advantage of toasted MicroSoy flakes (TSX02-M) over untoasted MicroSoy flakes, when used to replace 40% of the potato flake in a mashed potato mix. The untoasted MicroSoy flakes were made from triple null variety soybeans; while the toasted MicroSoy flakes were made from a blend of soybean varieties not including null or triple null. The test clearly demonstrates that a 40% addition of the TSX02-M toasted soybean flakes unexpectedly produced a nutty flavor with no beany or cooked beany flavor in the mashed potatoes; while the addition of 40% untoasted flakes even though made from triple null soybeans gave a beany flavor and a cooked beany flavor, with some of the taste testers reporting a slight raw beany after taste. The relative flavors and flavor intensities were reported as follows on a scale of 0 to 6 (6 being the highest flavor intensity):

(1) for the untoasted soybean flakes a beany flavor intensity of about 1 and a cooked beany flavor intensity of about 5; and, (2) for the toasted soybean flakes (TSX02-M) a nutty flavor intensity of about 5.

The invention claimed is:

1. A method of making toasted soybean flakes from soybean flakes, which have been prepared from full fat, enzyme active, mechanically dehulled soybeans, comprising the steps of:
   (1) feeding full fat, enzyme active soybean flakes, made from dehulled soybeans, into one end of a toaster-drier,
   (2) contacting the soybean flakes in the toaster-drier with a heated gas at a temperature and time sufficient to toast the flakes, whereby the beany and/or off-flavors are substantially eliminated without significant denaturing of the proteins in the flakes wherein said soybean flakes are subjected in said toaster-drier to a temperature between 350 and 420 F. from dry heated gas fro a relatively short time; and,
   (3) passing the toasted flakes from the toaster-drier to a cooler, whereby the toasted flakes are cooled to ambient temperature.

2. The method of claim 1 wherein the toasting time is between 3 and 5 minutes.

3. The method of claim 1 wherein the soybean flakes are subjected in the toaster-drier to fluidizing hot dry gas.

4. The method of claim 1 wherein the soybean flakes are subjected in the toaster-drier to vibration.

5. The method of claim 4 wherein the soybean flakes are subjected in the toaster-drier to a vibration of from 750 to 1100 Hertz.

6. The method of claim 1 wherein the toasted soybean flakes are subjected during cooling to fluidizing cooling gas.

7. The method of claim 1 wherein the toasted soybean flakes are subjected during cooling to vibration.

8. The method of claim 7 wherein the vibration during cooling is from 40 to 58 Hertz.

9. The method of claim 1 wherein gases and fines are removed during toasting and during cooling.

10. The method of claim 9 wherein the gases and fines removed during toasting and cooling are separated in a cyclone separator.

11. The method of claim 1 wherein the product depth of flakes in the toaster-drier is between 1 and 3.0 inches.

12. The method of claim 1 wherein the input flow rate of soybean flakes to the toaster-drier is between 4.5 and 6.5 lbs./min.

* * * * *